United States Patent
Kaanugovi et al.

(10) Patent No.: US 12,430,413 B2
(45) Date of Patent: Sep. 30, 2025

(54) SYSTEMS AND METHODS FOR GENERATING COMPOSITE USER PROFILES BASED ON LOCALLY-SOURCED AND AGGREGATED USER PROFILES

(71) Applicant: Capital One Services, LLC, McLean, VA (US)

(72) Inventors: Sudheendra Kumar Kaanugovi, Aldie, VA (US); Jorge Alexander Cabanilla, Bethesda, MD (US)

(73) Assignee: Capital One Services, LLC, McLean, VA (US)

(*) Notice: Subject to any disclaimer, the term of this patent is extended or adjusted under 35 U.S.C. 154(b) by 143 days.

(21) Appl. No.: 18/516,774

(22) Filed: Nov. 21, 2023

(65) Prior Publication Data

US 2025/0165567 A1     May 22, 2025

(51) Int. Cl.
*G06F 21/31* (2013.01)
*G06F 21/45* (2013.01)

(52) U.S. Cl.
CPC .............. *G06F 21/31* (2013.01); *G06F 21/45* (2013.01)

(58) Field of Classification Search
None
See application file for complete search history.

(56) References Cited

U.S. PATENT DOCUMENTS

| | | | |
|---|---|---|---|
| 11,531,736 B1* | 12/2022 | Sun | G10L 17/00 |
| 2016/0156618 A1* | 6/2016 | Draluk | G06F 21/31 726/7 |
| 2020/0042652 A1* | 2/2020 | Goenka | H04L 67/535 |
| 2020/0184050 A1* | 6/2020 | Toth | G06F 21/32 |

* cited by examiner

*Primary Examiner* — Nelson S. Giddins
(74) *Attorney, Agent, or Firm* — Foley & Lardner LLP (57) ABSTRACT

Methods and systems are described herein for generating composite user profiles using local profiles and aggregated user profiles. As one example, the system may present relevant data to users who initiate sessions on a user device. Specifically, the system may provide relevant data and content to users on user devices where they are the only user. Additionally, the system may present users who initiate a session on a shared device, content that is relevant to the specific user without commingling data or content from other users of the shared user device. Methods and systems are described herein for receiving, from a user, a user input to initiate a session on a user device and generating for display, in a user interface on the user device, a personalized device session based on the user profile.

20 Claims, 4 Drawing Sheets

SYSTEMS AND METHODS FOR GENERATING COMPOSITE USER PROFILES BASED ON LOCALLY-SOURCED AND AGGREGATED USER PROFILES

BACKGROUND

In recent years, the use of artificial intelligence, including, but not limited to, machine learning, deep learning, etc. (referred to collectively herein as artificial intelligence models, machine learning models, or simply models), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial-intelligence-based solutions, which limits the amount of people and resources available to create these practical implementations. Finally, results based on artificial intelligence are notoriously difficult to review, as the process by which the results are made may be unknown or obscured. This obscurity creates hurdles for identifying errors in the results, as well as improving the models providing the results. These technical problems present an inherent problem with attempting to use an artificial-intelligence-based solution in generating personalized sessions based on previous user activity on a shared device.

SUMMARY

Methods and systems are described herein for novel uses and/or improvements to artificial intelligence applications. As one example, methods and systems are described herein for presenting relevant data to users who initiate sessions on a user device. Specifically, methods and systems are described herein to provide relevant data and content to users on user devices where they are the only user. Methods and systems are described herein to present, to users who initiate a session on a shared device, content that is relevant to the specific user without commingling data or content from other users of the shared user device.

Existing systems may use a local profile to present options to a user on a shared user device, which would reduce the applicability of the presented content to the user. Existing systems may use an aggregated user profile to present options to a user on a user device with only one primary user, which would reduce the applicability of the presented content to the user. For example, existing systems may not have the necessary data processing capabilities or models to predict and select profiles for users based on multiple user profiles. However, the difficulty in adapting artificial intelligence models to determine a user profile for a session faces several technical challenges such as the inability to generate weights for user device sessions.

To overcome these technical deficiencies in adapting artificial intelligence models for this practical benefit, methods and systems disclosed herein select different user profiles based on the session authentication type. For example, some authentication types may be inherence-based and user-specific (e.g., biometric authentication), whereas some authentication types can be knowledge-based or possession-based and shared by multiple users (e.g., passwords, PINS, hardware tokens). When the system determines whether or not the authentication type is user-specific, the system may select a local user profile or an aggregated user profile. For example, the system may use a model that determines a weight for a user profile based on an authentication method that delivers more relevant content to the user. For example, the system uses an algorithm that assigns weights to user profiles based on the method of authentication used, which allows the system to overcome the technical challenge of determining a user profile for a session. Conventional thinking may dictate that the authentication method used for a device indicates the user during the session, however, passwords and PINs can easily be used by various individuals whereas biometric authentication is more challenging to replicate. Therefore, weighing the authentication method when determining which profiles to present during a session may lead to a more relevant session experience for the user. Accordingly, the methods and systems provide the practical benefit of allowing the system to predict which user is currently using the device and selecting a user profile accordingly.

In some aspects, methods and systems are designed to select between locally sourced and aggregated user profiles based on identified users. The system can receive, from a user, a first user input to initiate a first session with a first user device; in response to the first user input, query the user for authentication to initiate the first session; in response to querying the user, receive, from the user, a first user authentication, wherein the first user authentication corresponds to a first authentication type of a plurality of authentication types; retrieve a first user profile, wherein the first user profile is based on a first data model that is generated based only on user activity performed on the first user device; retrieve a second user profile, wherein the second user profile is based on a second data model that is generated based on aggregated user activity performed on the first user device and a second user device; determine a first weight for the first user profile based on the first authentication type; determine a second weight for the second user profile, wherein the first weight is determined to be greater than the second weight based on the first user authentication corresponding to the first authentication type; and generate for display, in a user interface on the first user device, a first personalized device session based on the first user profile.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
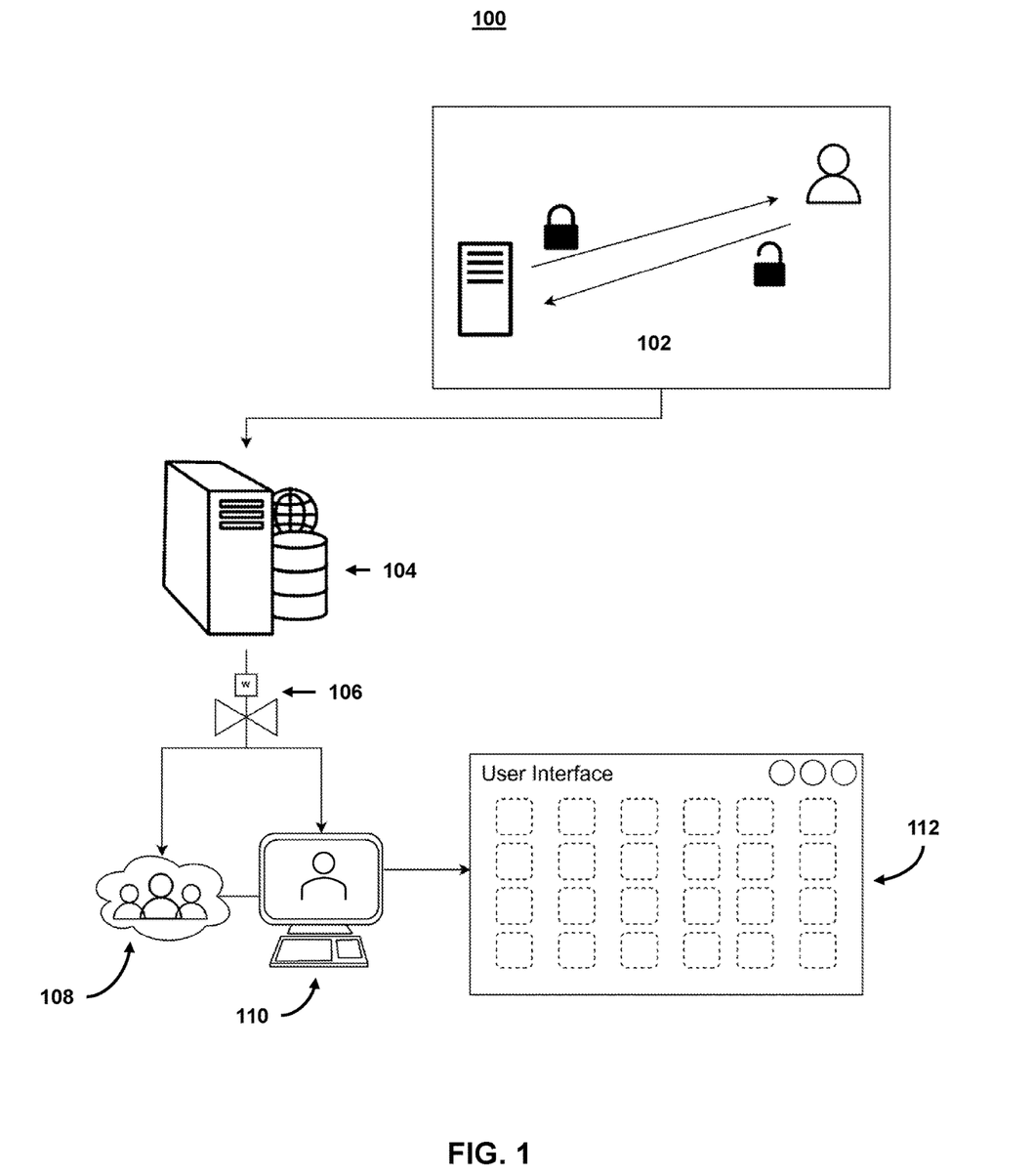
FIG. 1 shows an illustrative diagram for generating a composite user profile for a personalized device session based on the authentication method, in accordance with one or more embodiments.

FIG. 1 shows an illustrative diagram for generating a composite user profile for a personalized device session based on the authentication method, in accordance with one or more embodiments. For example, process 100 may include a server responsible for assigning weights based on the authentication type and/or determining a user profile for a corresponding session (e.g., server 104).

The server may receive an authentication from the user (e.g., authentication 102). The authentication type may be knowledge-based, possession-based, or inherence-based. Authentication 102 may be knowledge-based or possession-based, such as a password, passphrase, personal identification number (PIN), challenge-response authentication, security question, security card, wireless tag, or USB token. Authentication may be inherence-based, such as a fingerprint, retinal pattern, DNA sequence, signature, facial scan, or alternative biometric identifiers.

Server 104 may conduct a weighting process (e.g., weighting process 106) which may produce weights for various user profiles (e.g., aggregated user profile 108 or user-specific profile 110). An aggregated user profile such as aggregated user profile 108 may include one or more user activities or user characteristics. A user-specific profile such as user-specific profile 110 may include user activity or user characteristics associated with only one user.

For example, FIG. 1 illustrates server 104 weighing the user activity performed on the user device and the aggregated user activity performed on one or more user devices and presenting relevant user profiles in personalized device session 112. The server may use a machine learning algorithm to determine the weights for the user profiles by learning the behaviors and usage metrics of the user device to provide more relevant data for the respective session.

For example, if a user device is used by a specific individual at a specific time, the machine learning model may learn this behavior and assign a much higher weight to the user-specific profile. As such, the system may present relevant data to each user based on the authentication to the user device which allows more accurate recommendations and information on the user device.

The system may be used to provide data for a session on a user device. As referred to herein, a "session" may include a period when a user is interacting with a user device. The first session may comprise a period of time during which the same personalized device session is active on the user device. For example, the starting point of the interaction period may be when a user logs into or accesses a user device. The ending point may be when the user logs out of the device or shuts down the device.

The system may be used to determine the best-suited weights for profiles to present to a user for a device session. As referred to herein, an "authentication" may be used to prove identity. For example, the user authentication may comprise biometric data from the user or textual input from the user. In some embodiments, the authentication may comprise an authentication type.

In some embodiments, the authentication type may comprise a knowledge-based method of authentication. For example, a knowledge-based method of authentication may include authenticating using textual data such as passwords, passphrases, PINs, or answers to secret questions. Because a knowledge-based method of authentication can be easily shared, it may be referred to as a non-specific means of authentication. In some embodiments, the authentication may comprise a possession-based method of authentication. For example, a possession-based method of authentication may include card readers, wireless tags, or USB tokens. Because a possession-based method of authentication can be transferred between users, it may be referred to as a non-specific means of authentication. In some embodiments, the authentication may comprise an inherence-based method of authentication. For example, an inherence-based method of authentication may include biometric data such as a retinal scan, a facial scan, a DNA sequence, or a fingerprint. Because an inherence-based method of authentication cannot easily be transferred or replicated, it may be referred to as a specific means of authentication.

As referred to herein, a "user interface" may comprise a human-computer interaction and communication in a device and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

The system may monitor content generated by the user to generate user profile data. As referred to herein, a "user profile" and/or "user profile data" may comprise data actively and/or passively collected about a user. A user profile may include content consumed and/or created by a user. A user profile and/or user data may comprise data actively and/or passively collected about more than one user. For example, the user profile data may comprise content generated by the users and associated characteristics. For example, a user profile may have the settings for the one or more users' installed programs and operating system. In some embodiments, the user profile may be a visual display of personal data associated with a specific user or a group of users. The user profile may also be a customized desktop environment. In some embodiments, the user profile may be a digital representation of a person's identity or a group's identity. The data in the user profile may be generated based on the system actively or passively monitoring.

User profile data may comprise user activity. As referred to herein, "user activity" may include actions performed by the user resulting in the generation or consumption of data on a user device. For example, the user activity may comprise purchases, clicks, likes, shares, or subscriptions.

User profile data may also include a user characteristic. As referred to herein, a "user characteristic" may include data about one or more users and/or information included in a directory of stored user settings, preferences, and information for the one or more users.

The system may be used to generate predictions for profiles to present during a new session by using a data model. As referred to herein, a "data model" may include a neural network, such as a multi-layer perceptron, a convolutional neural network, a recurrent neural network, a long-short term memory neural network, a transformer neural network, a neural network with an attention mechanism, adversarial neural networks, or a neural network comprising different layers, mechanisms, and structures of at least one of the foregoing neural networks. A data model may take one or more inputs to produce one or more outputs.

A data model may use weights to determine an output. As referred to herein, a "weight" may comprise a vector or tensor output from a neural network, a feature generated from principal component analysis, or some other dimension reduction method. A weight may comprise a latent variable derived from expectation-maximization, a feature that is representative or descriptive of cluster assignments, a statistical distribution, or a statistical mixture model, etc. A weight may also comprise some combination of any engineered feature, both directly referenced among the foregoing and not, which provides a point of reference for a real-life user and enables them to be numerically described and compared to other real-life users. A weight may also inform the decisions and outputs of a data model.

Figure 2:
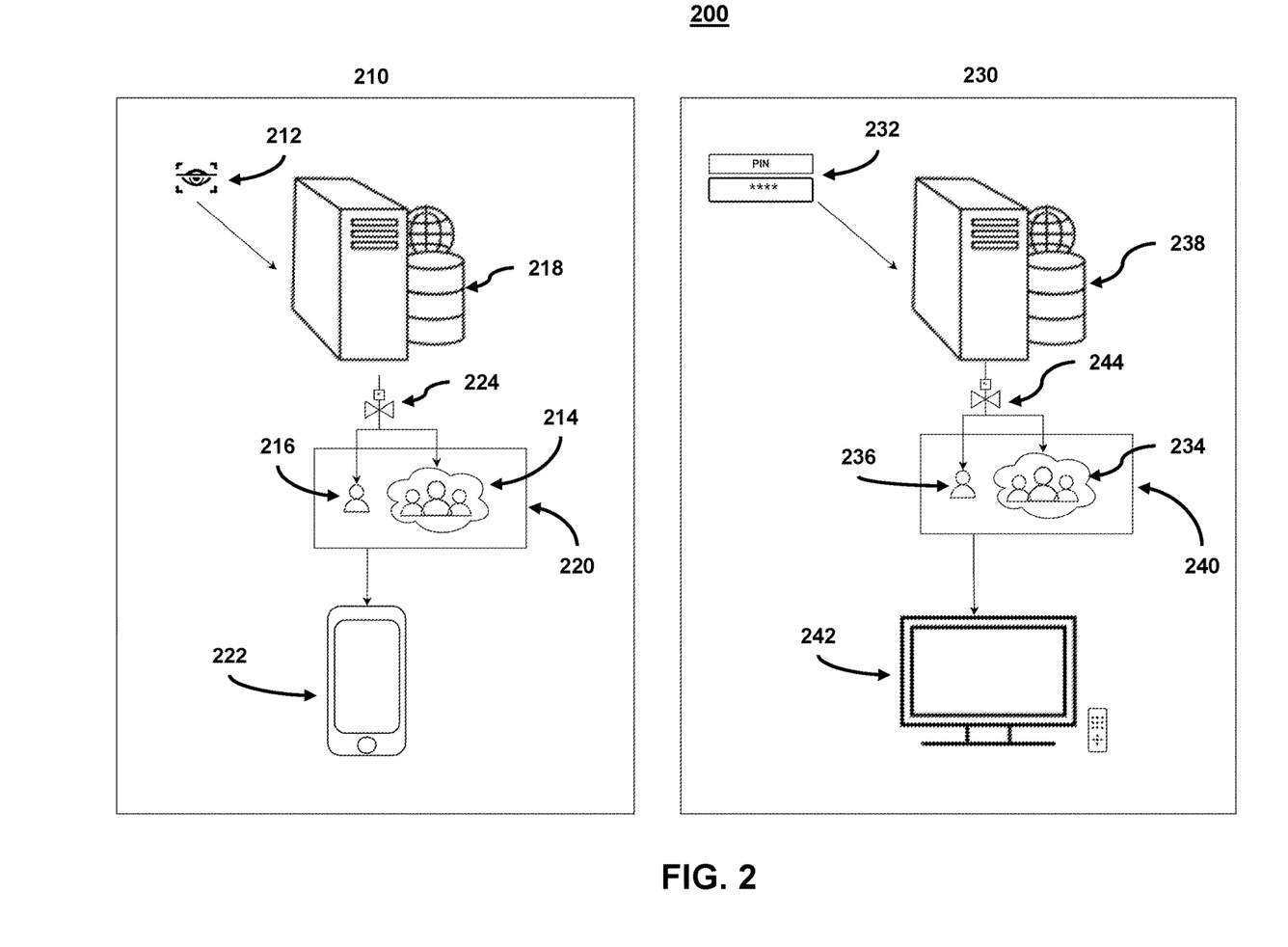
FIG. 2 shows an illustrative diagram for determining weights for user profiles based on differing authentication types, in accordance with one or more embodiments.

FIG. 2 shows an illustrative diagram for determining weights for user profiles based on differing authentication types, in accordance with one or more embodiments. Process 200 may include server 218 and server 238. Server 218 and server 238 may assign weights (e.g., assigning weights with model 224 or model 244) to one or more profiles to create a composite user profile which may include a local profile and an aggregated profile. By using a server (e.g., server 218 or server 238) to verify authentication and weight user profiles, relevant data may be presented to the user or group of users participating in a personalized device session. Personalizing the data presented in the user interface to the user makes the content displayed more relevant for the user or group of users interacting with the device and increases the usability for the user.

For example, in example 210, server 218 may receive an inherence-based means of authentication (e.g., retinal scan 212). Based on the inherence-based authentication, server 218 may recognize that the user authenticating to the system is unique (i.e., the credential used to authenticate is user-specific and cannot be replicated or used by more than one user.).

Consequently, server 218 may assign a higher weight to local profile 216 and a lower weight to aggregated profile 214 as it is more likely that the device is not shared among users. Server 218 may also use a machine learning model in conjunction with user activity and user characteristics to determine weights for local profile 216 and aggregated profile 214. Server 218 may collate the weights and profiles into a composite user profile (e.g., composite user profile 220). The system may then provide data from the composite user profile for the session initiated by the user on user device 222.

For example, in example 230, server 238 may receive a knowledge-based means of authentication (e.g., PIN 232). Based on the knowledge-based authentication, server 238 may recognize that the user authenticating to the system may not be unique (i.e., the credential used to authenticate is not user-specific and it may be replicated or easily memorized or shared among multiple users).

Consequently, server 238 may assign a lower weight to local profile 236 and a higher weight to aggregated profile 234 as it is more likely that the device is shared among users. Server 238 may also use a machine learning model in conjunction with user activity and user characteristics to determine weights for local profile 236 and aggregated profile 234. Server 238 may collate the weights and profiles into a composite user profile (e.g., composite user profile 240). The system may then provide data from the composite user profile for the session initiated by the user on user device 242.

The system may use a personalized device session to provide relevant data to users who have initiated a session on a user device. As referred to herein, a "personalized device session" may include recommended content that is selected from available content based on prior user activity, transactions, and/or accessed content. Personalized device sessions may also include targeted advertisements based on prior user activity, transactions, and/or accessed content.

In some embodiments, multiple pieces of device metadata including authentication type, device type, and device description, along with the device sharing status ground truth, may be used to train a classifier on server 238. The device-sharing classifier may be logistic regression, naive Bayes or a multi-layer perceptron with softmax activation. Intuitive "feature extraction" treatment of the device description text may be used by performing named entity recognition to see if there's a person or organization present. Performing named entity recognition may convert features into a categorical variable: person, organization, or none. The classifier may also be an ensemble mode, a submodel of which may be a transformer, a recurrent neural network (RNN), or some other equivalent that fully comprehends the description text. The classification probability output of the model may further be leveraged in determining the weights between user profiles.

In some embodiments, the system may identify if a device is shared is based on data aggregated from multiple devices. For example, the system may determine a personalized device session by creating a composite user profile and selecting user activity, transactions, and/or access content from the data included in the composite user profile. For example, by determining a composite user profile, the system may provide relevant content and advertisements to the user or users.

The system may use a local profile to determine the composite user profile. As referred to herein, a "local profile" may include a profile based only on the user activity performed on the user device. In some embodiments, the local profile may comprise the usage data from a single user on a user device such as a mobile phone. In some embodiments, the local profile may comprise multiple users, such as a smart television which may be used by more than one user.

In some embodiments, the system may determine the local profile by making an API call to the account associated with the user device. For example, by determining the local profile by making an API call to the account associated with the user device, the system may receive the data associated with the local user device and generate a user interface with more relevant data for the user. Additionally or alternatively, the system may determine a local profile by accessing the hard drive of the user device and determining data pertaining to user activity, transactions, and/or accessed content. For example, by determining a local profile by accessing the hard drive of the user device and determining relevant data, the system can identify a local profile even if an account is not necessarily associated with the profile.

The system may use an aggregated profile to present relevant data to the user. As referred to herein, an "aggregated profile" may include a profile based on aggregated user activity performed on one or more user devices by one or more users. In some embodiments, the aggregated profile may comprise aggregated user activity.

In some embodiments, the system may identify if a device is shared based on data aggregated from multiple users. For example, data aggregated from multiple users may include a scenario where multiple users share a single device and thus the data on the device is aggregated from the multiple users who share the single device. In such an instance, the system may determine relevant content for device sessions based less on a single-user profile and more on a multi-user profile.

In some embodiments, the system may determine an aggregated profile by making an API call to the account associated with the one or more user devices. For example, by determining an aggregated profile by making an API call to the account associated with the one or more user devices, the system may generate a user interface with more relevant data for the user. Additionally or alternatively, the system may determine an aggregated profile by accessing the hard drive of the one or more user devices and determining data pertaining to user activity, transactions, and/or accessed content. For example, by determining an aggregated profile by accessing the hard drive of the one or more user devices and determining relevant data, the system can identify a local profile even if an account is not necessarily associated with the profile.

The system may use aggregated user activity in determining a composite user profile. As referred to herein, an "aggregated user activity" may include user activity aggregated from one or more devices. If the aggregated user activity is used, the system may generate an average of one or more data models, a normalized average of one or more data models, or a weighted combination of one or more data models.

In some embodiments, the system may determine aggregated user activity by querying multiple devices for data pertaining to user activity, transactions, and/or accessed content. For example, by determining aggregated user activity by querying multiple devices for data pertaining to user activity, transactions, and/or accessed content, the system may determine aggregated user activity to use in determining the weights of profiles that go into a composite user profile to help present relevant data to users.

The system may generate a composite profile to use in a session on a user device. As referred to herein, a "composite user profile" may include a weighted aggregation of a first user profile and a second user profile. By using the weighted aggregation, that system may generate content that favors a particular data model underlying the first or second user profile.

In some embodiments, the system may determine a composite user profile by aggregating a local profile and an aggregate profile based on weights assigned by the system. For example, by determining the composite user profile by aggregating a local profile and an aggregated profile, the system may provide relevant user data for the user that initiated the session on the device.

In some embodiments, the system may identify if a device is shared based on a two-tier "aggregated profile" such that data associated with a user using multiple devices may be combined into an aggregated profile. For example, the system may orchestrate profiles cross-user (i.e., based on data aggregated from multiple users) in the top tier, and the profile of each user may be further assembled cross-device (i.e., based on data aggregated from multiple devices from each of the user's sub-profiles from findable devices in the bottom tier). For example, there may be sub-profiles $x\_1, \ldots, x\_m$ (e.g., x is a profile instance in the top tier) and a current device of D. In a cross-device composition of each user profile x, the system may assign different weights to sub-profile $x\_i$ from a device similar to D as opposed to a sub-profile $x\_j$ from a device dissimilar to D. This similarity may correspond to device type, for instance, if D is a TV, then sub-profiles on personal tablets or mobile phones may be more relevant than those on workstations as TV operations may be more likely replicated on a personal tablet or mobile phone than on a workstation.

Figure 3:
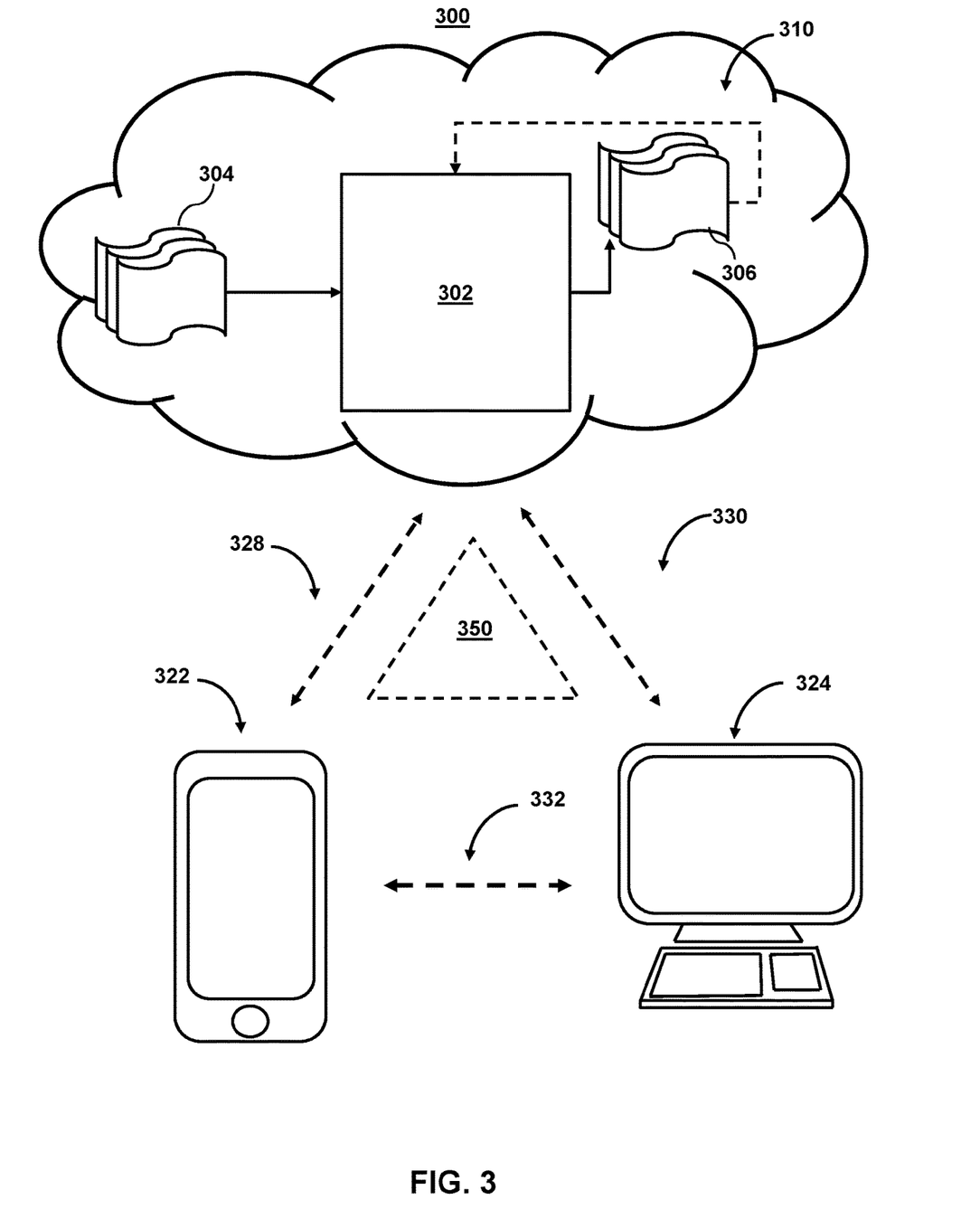
FIG. 3 shows illustrative components for a system used to generate a composite user profile for a session, in accordance with one or more embodiments.

FIG. 3 shows illustrative components for a system used to generate a composite user profile for a session, in accordance with one or more embodiments. For example, FIG. 3 may show illustrative components for generating a composite profile to deliver relevant content to one or more users of a user device. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 is shown as a touch-screen smartphone, the display also act as user input interface. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include inputs 304, model 302, and outputs 306. Inputs 304 may include authentication attempts, user accounts and user profiles. Model 302 may be used to determine weights for the user profiles based on the authentication type of the authentication attempts. Outputs 306 may include a composite user profile to be used with one or more user devices (e.g., mobile device 322 and/or terminal 324).

Cloud components 310 may access accounts related to user profiles or user accounts related to the user device. Access to accounts related to user profiles or user accounts related to the user device are necessary to establish local and aggregated user profiles. Establishing these profiles helps in generating the composite user profile to present for a personalized device session.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or in conjunction with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., the likelihood a user initiating a session on the user device is the genuine user or that the user initiating the session is not the same user who created the authentication method).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., high likelihood that the user is genuine, low likelihood that the user is genuine, high likelihood that the account is shared, or low likelihood that the account is shared).

In some embodiments, the model (e.g., model 302) may automatically perform actions based on outputs 306. In some embodiments, the model (e.g., model 302) may not perform any actions. The output of the model (e.g., model 302) may be used to generate for display, in a user interface on the first user device, a first personalized device session based on the first user profile.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

Figure 4:
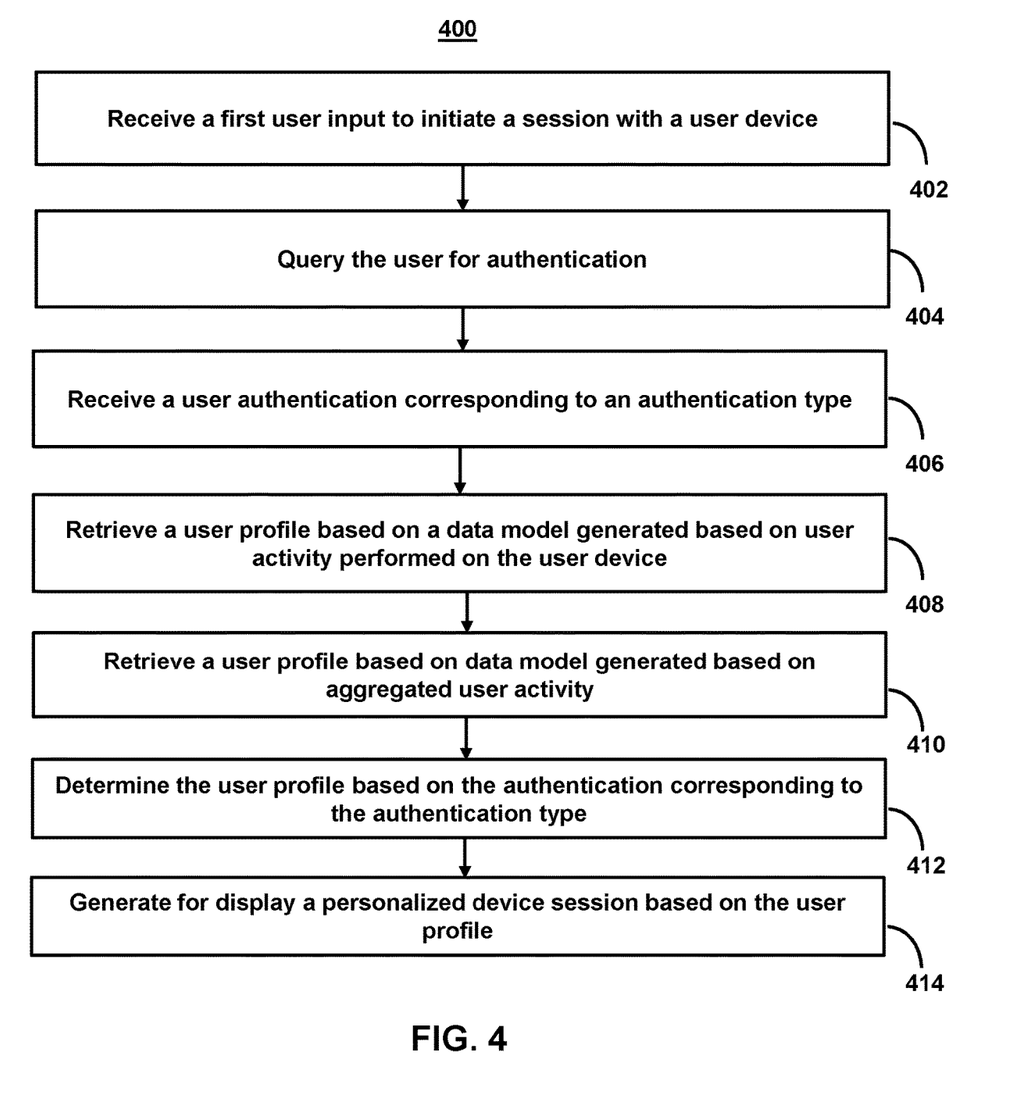
FIG. 4 shows a flowchart of the steps involved in generating a personalized device session based on a composite user profile, in accordance with one or more embodiments.

FIG. 4 shows a flowchart of the steps involved in generating a personalized device session based on a composite user profile, in accordance with one or more embodiments. For example, the system may use process 400 (e.g., as implemented on one or more system components described above) in order to provide relevant data for a session initiated by a user irrespective of device ownership. Providing relevant data to users based on authentication type helps provide more granular information about the user, especially if the user device is a shared device.

At step 402, process 400 (e.g., using one or more components described above) receives a first user input to initiate a session with a user device. For example, the system may receive, from a user, a first user input to initiate a first session with a first user device. For example, a user may turn on a smart tv and enter a PIN that would create a session. By doing so, the system may assess the authentication method and provide a more generalized composite profile to provide data for the personalized device session. For example, the authentication method may be the PIN, and creating a personalized user session may include determining that, based on the PIN, it is a shared device. The system may update the composite user profile accordingly.

At step 404, process 400 (e.g., using one or more components described above) may query the user for authentication. For example, the system may, in response to the first user input, query the user for authentication to initiate the first session. For example, the system may request authentication from the user. For example, a smart TV may prompt the user to enter a PIN before displaying content. By doing so, the system may use the authentication type in generating the composite user profile to provide more relevant content to the user.

In some embodiments, the system may generate a second personalized user session based on a second user device profile. For example, the system may receive, from the user, a second user input to initiate a second session with the first user device, in response to the second user input, query the user for authentication to initiate the second session, in response to querying the user, receive, from the user, a second user authentication, wherein the second user authentication corresponds to a second authentication type of the plurality of authentication types, determine to use the second user profile based on the second user authentication corresponding to the second authentication type, and generate for display, in the user interface on the first user device, a second personalized device session based on the second user profile. For example, the system may receive a second user input to initiate a second session. By doing so, the system may be able to adapt the personalized device session on a user device with multiple consecutive users, such as a shared computer or a smart TV.

At step 406, process 400 (e.g., using one or more components described above) may receive a user authentication corresponding to an authentication type. For example, the system may, in response to querying the user, receive, from the user, a first user authentication, wherein the first user authentication corresponds to a first authentication type of a plurality of authentication types. The authentication type may be a knowledge-based method of authentication that may include authenticating using textual data such as passwords, passphrases, PINs or answers to secret questions (a non-specific means of authentication). The authentication type may be a possession-based method of authentication which may include card readers, wireless tags, or USB tokens (non-specific means of authentication). The authentication type may be an inherence-based method of authentication and may include biometric data such as a retinal scan, a facial scan, a DNA sequence, or a fingerprint (specific means of authentication). By doing so, the system may predict, based on the authentication type, the likelihood that the user associated with the authentication was the user who performed the authentication. For example, a knowledge-based method of authentication may result in a low confidence in the user's identity as passwords, PINS, and other textual data as they are easy to replicate or share. Alternatively, an inherence-based method of authentication may result in a high confidence in the user's identity as biometric data is difficult to replicate or share.

In some embodiments, the first authentication method and the second authentication method may be different authentication types. For example, the system may include two authentication types wherein the first authentication type comprises a biometric authentication, and wherein the second authentication type comprises a textual input authentication. For example, the system may present a composite profile to a session wherein the weights for an aggregated profile are higher than the local profile because the authentication method is inherence-based. After the inherence-based authentication session is closed, the system may present another composite profile on the same device wherein the weights for an aggregated profile are lower than the local profile because the authentication method is knowledge-based. By doing so, the system may adapt the content and recommendations for users based on the likelihood the device is shared.

In some embodiments, the first authentication may be user-specific and the second authentication may be non-user-specific. For example, the system may include two authentication types wherein the first authentication type comprises a user-specific authentication, wherein the user-specific authentication is unique to a single user, wherein the second authentication type comprises a non-user-specific authentication, and wherein the non-user-specific authentication is shareable by multiple users. For example, a smart TV may prompt a user for an authentication and, in response, receive a user-specific authentication such as an inherence-based authentication. After the session initiated by the inherence-based authentication method has ended, the system may prompt another user for an authentication and, in response, receive a non-user-specific authentication such as a knowledge-based authentication such as a password or a PIN. By doing so, the system may provide relevant content to the user depending on the likelihood the user who initiated the session is the primary user of the device as determined by the authentication method.

At step 408, process 400 (e.g., using one or more components described above) may retrieve a user profile based on a data model generated based on user activity performed on the user device. For example, the system may retrieve a first user profile, wherein the first user profile is based on a first data model that is generated based only on user activity performed on the first user device. For example, the system may retrieve a user profile that is local to the user device. For example, the system may retrieve the data stored locally on a mobile phone. By doing so, the system may determine data relevant to a primary user of a user device. Identifying relevant data for the primary user may help the system generate a more relevant composite user profile to display for the user.

At step 410, process 400 (e.g., using one or more components described above) may retrieve a user profile based on a data model generated based on aggregated user activity. For example, the system may retrieve a second user profile, wherein the second user profile is based on a second data model that is generated based on aggregated user activity performed on the first user device and a second user device. For example, the system may retrieve a user profile that is compiled from multiple sources. The aggregated user activity may include user data from two user devices. For example, the aggregated user activity may include data from a mobile device and a tablet. By doing so, the system may identify more relevant data to present in a composite user profile regardless of if the user uses more than one device.

At step 412, process 400 (e.g., using one or more components described above) may determine the user profile based on the authentication corresponding to the authentication type. For example, the system may determine to use the first user profile based on the first user authentication corresponding to the first authentication type. For example, if the authentication type is an inherence-based method of authentication, the user profile may be user-specific as it is a high likelihood the user is the only individual using the account. Alternatively, if the authentication type is a knowledge-based method of authentication, the user profile may be non-user-specific as the credentials used to authenticate may have been shared. By determining the user profile based on the authentication type, the system may provide relevant data for situations where only one user uses a user device and user devices are shared among multiple users.

In some embodiments, the system may determine two distinct weights for a first user profile and a second user profile. For example, the system may determine a first weight for the first user profile based on the first authentication type and determine a second weight for the second user profile, wherein the first weight is greater than the second weight. For example, the first weight may comprise an output from a neural network (e.g., a vector or tensor), or a feature generated from a dimension reduction method (e.g., principal component analysis). The first weight may comprise a latent variable derived from expectation-maximization, a feature that is representative or descriptive of cluster assignments, a statistical distribution or a statistical mixture model, or some combination of any engineered feature, both directly referenced among the foregoing and not referenced. By doing so, the system may, by using the cluster assignment and statistical feature, provide a point of reference for a real-life user and enable the user to be numerically described and compared to other real-life users.

In some embodiments, the system may generate a personalized device session based on a composite user profile based on two user profiles. For example, the system may determine a composite user profile based on the first weight for the first user profile and the second weight for the second user profile and generate the first personalized device session based on the composite user profile. For example, the system may generate a composite user profile based on a weighted aggregation of a first user profile and a second user profile. By using the weighted aggregation of the two user profiles, the system may generate content that favors a particular data model underlying the first or second user profile. Furthermore, by using the weighted aggregation of the two user profiles, the system may provide content during the personalized device session that is relevant to the user.

In some embodiments, the system may use the duration of the session to determine the weights of the user profiles. For example, the system may determine a ratio of a first amount of time and a second amount of time, wherein the first amount of time corresponds to use of the first user device by the user and wherein the second amount of time corresponds to use of the first user device by one or more other users, and it may determine the first weight based on the ratio. For example, the system may determine, based on the authentication type and other factors, that a user device is not shared (i.e., the user device has only one user). Therefore, the system may use a user profile that is based on only activity performed locally on a user device because there is a high probability that the user device is not shared. By doing so, the system may generate a personalized device session that provides relevant content to a user on a user device that is not shared.

In some embodiments, the system may use authentication attempts to determine a weight for a user profile. For example, the system may determine a first number of successful authentications using the first authentication type, determine a second number of unsuccessful authentications using the first authentication type, determine a ratio of the first number of successful authentications to the second number of successful authentications, and determine the first weight based on the ratio. For example, if a user-specific authentication type has a high ratio of success, the system may determine that the same user typically uses a user device. Alternatively, if the user-specific authentication type has a low ratio of success, the system may determine that one or more users use this device. By doing so, the system may be able to differentiate between a shared user device and a personal user device which may allow the system to provide more relevant data for the personalized device session.

In some embodiments, the duration of a user device session is active may inform the weight the system assigns to a user profile. For example, the system may determine a length of time wherein the length of time corresponds to use of the first user device and determine the first weight based on the length of time. For example, when a user device is first used, a data model based on user activity on that device does not have much data and/or has not been adequately trained. In such cases, the system may use or more heavily weight an aggregated user profile over a local profile. By doing so, the system may provide relevant data to users, even in cases where the duration of a user device session is short.

In some embodiments, the number of sessions on a user device may inform the weight the system assigns to a user profile. For example, the system may determine a number of sessions conducted on the first user device and determine the first weight based on the number of sessions. For example, when a device is first used, a data model based on user activity on that device does not have much data and/or has not been adequately trained. In such cases, the system may use (or more heavily weight) an aggregated user profile. By doing so, the system may provide relevant data for a composite user profile for use in a user-initiated session on a user device. Specifically, by considering the frequency of use, the system can identify frequent users to present more relevant data.

In some embodiments, the system may consider the number of authentication attempts in determining user profile weights. For example, the system may determine a number of authentications conducted on the first user device and determine the first weight based on the number of authentications. For example, when a device is first used (e.g., corresponding to a scenario with few authentications), a data model based on user activity on that device does not have much data and/or has not been adequately trained. In such cases, the system may use (or more heavily weight) an aggregated user profile. By doing so, the system may provide relevant data for a composite user profile for use in a user-initiated session on a user device. Specifically, by considering the number of authentication attempts, the system can provide data that corresponds to the likelihood the user device is shared among multiple users.

In some embodiments, the system may update the first weight based on a third user input that includes a selection during the first personalized device session. For example, the system may receive a third user input, wherein the third user input comprises a user selection during the first personalized device session, determine that the user selection is inconsistent with the first user profile, and adjust the first weight based on the determination that the user selection is inconsistent with the first user profile. For example, the system may adjust the weight attributed to a user profile if the system determines that the user profile (and/or its underlying data model) is not accurate based on a user input on a user device during a personalized device session. By doing so, the system may correct the user profile weight if it is inaccurate thereby providing more relevant data for the personalized device session.

At step 414, process 400 (e.g., using one or more components described above) may generate for display a personalized device session based on the user profile. For example, the system may generate for display, in a user interface on the first user device, a first personalized device session based on the first user profile. For example, the system may generate a user interface on a smart TV by creating a personalized device session based on the user profile that shows relevant content recommendations and relevant advertisements. Additionally, the system may generate a user interface on a laptop by creating a personalized device session based on the user profile that shows relevant application recommendations and relevant advertisements. By doing so, the system may provide tailored content for the user to directly interact with on a user device during a personalized device session.

In some embodiments, the system may create a composite user profile based on the weights for a first and second user profile. For example, the system may determine a composite user profile based on the first weight for the first user profile and the second weight for the second user profile and generate the first personalized device session based on the composite user profile. For example, the system may generate a composite user profile based on a weighted aggregation of a first user profile and a second user profile. By using the weighted aggregation of the first user profile and the second user profile, the system may generate content that favors a particular data model underlying the first user profile or the second user profile.

In some embodiments, the system may use a multi-feature classification model to determine if a device is shared among users. Additional features for consideration in a multi-feature classification model may include device metadata including authentication type, device type, or device description. The device type may be relevant in instances when the device type is a commonly shared device. For example, the device type may be a smart TV which is often shared among members of a household. As another example, the device type may be a smart phone which is often only used by a single user. Device description may also be relevant in instances where the description of a device can identify if it is shared or used by a single user. For example, a device description "Tom's workstation" may be less likely to be a shared device than one marked "lab workstation."

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, from a user, a first user input to initiate a first session with a first user device; in response to the first user input, querying the user for authentication to initiate the first session; in response to querying the user, receiving, from the user, a first user authentication, wherein the first user authentication corresponds to a first authentication type of a plurality of authentication types; retrieving a first user profile, wherein the first user profile is based on a first data model that is generated based only on user activity performed on the first user device; retrieving a second user profile, wherein the second user profile is based on a second data model that is generated based on aggregated user activity performed on the first user device and a second user device; determining to use the first user profile based on the first user authentication corresponding to the first authentication type; and generating for display, in a user interface on the first user device, a first personalized device session based on the first user profile.
2. The method of any one of the preceding embodiments, further comprising: receiving, from the user, a second user input to initiate a second session with the first user device; in response to the second user input, querying the user for authentication to initiate the second session; in response to querying the user, receiving, from the user, a second user authentication, wherein the second user authentication corresponds to a second authentication type of the plurality of authentication types; determining to use the second user profile based on the second user authentication corresponding to the second authentication type; and generating for display, in the user interface on the first user device, a second personalized device session based on the second user profile.
3. The method of any one of the preceding embodiments, wherein the first authentication type comprises a biometric authentication, and wherein the second authentication type comprises a textual input authentication.
4. The method of any one of the preceding embodiments, wherein the first authentication type comprises a user-specific authentication, wherein the user-specific authentication is unique to a single user, wherein the second authentication type comprises non user-specific authentication, and wherein the non user-specific authentication is shareable by multiple users.
5. The method of any one of the preceding embodiments, wherein determining to use the first user profile based on the first authentication type further comprises: determining a first weight for the first user profile based on the first authentication type; and determining a second weight for the second user profile, wherein the first weight is greater than the second weight.
6. The method of any one of the preceding embodiments, wherein generating for display, in the user interface on the first user device, the first personalized device session based on the first user profile further comprises: determining a composite user profile based on the first weight for the first user profile and the second weight for the second user profile; and generating the first personalized device session based on the composite user profile.
7. The method of any one of the preceding embodiments, further comprising: determining a ratio of a first amount of time and a second amount of time, wherein the first amount of time corresponds to use of the first user device by the user, and wherein the second amount of time corresponds to use of the first user device by one or more other users; and determining the first weight based on the ratio.
8. The method of any one of the preceding embodiments, further comprising: determining a first number of successful authentications using the first authentication type; determining a second number of unsuccessful authentications using the first authentication type; determining a ratio of the first number of successful authentications to the second number of unsuccessful authentications; and determining the first weight based on the ratio.
9. The method of any one of the preceding embodiments, further comprising: determining a length of time, wherein the length of time corresponds to use of the first user device; and determining the first weight based on the length of time.
10. The method of any one of the preceding embodiments, further comprising: determining a number of sessions conducted on the first user device; and determining the first weight based on the number of sessions.
11. The method of any one of the preceding embodiments, further comprising: determining a number of authentications conducted on the first user device; and determining the first weight based on the number of authentications.
12. The method of any one of the preceding embodiments, further comprising: receiving a third user input, wherein the third user input comprises a user selection during the first personalized device session; determining that the user selection is inconsistent with the first user profile; and adjusting the first weight based on the determining that the user selection is inconsistent with the first user profile.

13. A tangible, non-transitory, machine-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for selecting between locally-sourced and aggregated user profiles based on identified users, the system comprising:
one or more processors; and
a non-transitory computer-readable medium comprising instructions that when executed by the one or more processors cause operations comprising:
receiving, from a user, a first user input to initiate a first session with a first user device;
in response to the first user input, querying the user for authentication to initiate the first session;
in response to querying the user, receiving, from the user, a first user authentication, wherein the first user authentication corresponds to a first authentication type of a plurality of authentication types;
retrieving a first user profile, wherein the first user profile is based on a first data model that is generated based only on user activity performed on the first user device;
retrieving a second user profile, wherein the second user profile is based on a second data model that is generated based on aggregated user activity performed on the first user device and a second user device;
determining a first weight for the first user profile based on the first authentication type;
determining a second weight for the second user profile, wherein the first weight is determined to be greater than the second weight based on the first user authentication corresponding to the first authentication type; and
generating for display, in a user interface on the first user device, a first personalized device session based on the first user profile.

2. A method for selecting between locally-sourced and aggregated user profiles based on identified users, the method comprising:
receiving, from a user, a first user input to initiate a first session with a first user device;
in response to the first user input, querying the user for authentication to initiate the first session;
in response to querying the user, receiving, from the user, a first user authentication, wherein the first user authentication corresponds to a first authentication type of a plurality of authentication types;
retrieving a first user profile, wherein the first user profile is based on a first data model that is generated based only on user activity performed on the first user device;
retrieving a second user profile, wherein the second user profile is based on a second data model that is generated based on aggregated user activity performed on the first user device and a second user device;
determining to use the first user profile based on the first user authentication corresponding to the first authentication type; and
generating for display, in a user interface on the first user device, a first personalized device session based on the first user profile.

3. The method of claim 2, further comprising:
receiving, from the user, a second user input to initiate a second session with the first user device;
in response to the second user input, querying the user for authentication to initiate the second session;
in response to querying the user, receiving, from the user, a second user authentication, wherein the second user authentication corresponds to a second authentication type of the plurality of authentication types;
determining to use the second user profile based on the second user authentication corresponding to the second authentication type; and
generating for display, in the user interface on the first user device, a second personalized device session based on the second user profile.

4. The method of claim 3, wherein the first authentication type comprises a biometric authentication, and wherein the second authentication type comprises a textual input authentication.

5. The method of claim 3, wherein the first authentication type comprises a user-specific authentication, wherein the user-specific authentication is unique to a single user, wherein the second authentication type comprises non user-specific authentication, and wherein the non user-specific authentication is shareable by multiple users.

6. The method of claim 2, wherein determining to use the first user profile based on the first authentication type further comprises:
determining a first weight for the first user profile based on the first authentication type; and
determining a second weight for the second user profile, wherein the first weight is greater than the second weight.

7. The method of claim 6, wherein generating for display, in the user interface on the first user device, the first personalized device session based on the first user profile further comprises:
determining a composite user profile based on the first weight for the first user profile and the second weight for the second user profile; and
generating the first personalized device session based on the composite user profile.

8. The method of claim 6, further comprising:
determining a ratio of a first amount of time and a second amount of time, wherein the first amount of time corresponds to use of the first user device by the user, and wherein the second amount of time corresponds to use of the first user device by one or more other users; and
determining the first weight based on the ratio.

9. The method of claim 6, further comprising:
determining a first number of successful authentications using the first authentication type;
determining a second number of unsuccessful authentications using the first authentication type;
determining a ratio of the first number of successful authentications to the second number of unsuccessful authentications; and
determining the first weight based on the ratio.

10. The method of claim 6, further comprising:
determining a length of time, wherein the length of time corresponds to use of the first user device; and
determining the first weight based on the length of time.

11. The method of claim 6, further comprising:
determining a number of sessions conducted on the first user device; and
determining the first weight based on the number of sessions.

12. The method of claim 6, further comprising:
determining a number of authentications conducted on the first user device; and
determining the first weight based on the number of authentications.

13. The method of claim 6, further comprising:
receiving a third user input, wherein the third user input comprises a user selection during the first personalized device session;
determining that the user selection is inconsistent with the first user profile; and
adjusting the first weight based on the determining that the user selection is inconsistent with the first user profile.

14. A non-transitory, computer-readable medium comprising instructions that when executed by one or more processors cause operations comprising:
receiving, from a user, a first user input to initiate a first session with a first user device;
in response to the first user input, querying the user for authentication to initiate the first session;
in response to querying the user, receiving, from the user, a first user authentication, wherein the first user authentication corresponds to a first authentication type of a plurality of authentication types;
retrieving a first user profile, wherein the first user profile is based on a first data model that is generated based only on user activity performed on the first user device;
retrieving a second user profile, wherein the second user profile is based on a second data model that is generated based on aggregated user activity performed on the first user device and a second user device;
determining to use the first user profile based on the first user authentication corresponding to the first authentication type; and
generating for display, in a user interface on the first user device, a first personalized device session based on the first user profile.

15. The non-transitory, computer-readable medium of claim 14, further comprising:
receiving, from the user, a second user input to initiate a second session with the first user device;
in response to the second user input, querying the user for authentication to initiate the second session;
in response to querying the user, receiving, from the user, a second user authentication, wherein the second user authentication corresponds to a second authentication type of the plurality of authentication types;
determining to use the second user profile based on the second user authentication corresponding to the second authentication type; and
generating for display, in the user interface on the first user device, a second personalized device session based on the second user profile.

16. The non-transitory, computer-readable medium of claim 15, wherein the first authentication type comprises a user-specific authentication, wherein the user-specific authentication is unique to a single user, wherein the second authentication type comprises non user-specific authentication, and wherein the non user-specific authentication is shareable by multiple users.

17. The non-transitory, computer-readable medium of claim 14, wherein determining to use the first user profile based on the first authentication type further comprises:
determining a first weight for the first user profile based on the first authentication type; and
determining a second weight for the second user profile, wherein the first weight is greater than the second weight.

18. The non-transitory, computer-readable medium of claim 17, wherein generating for display, in the user interface on the first user device, the first personalized device session based on the first user profile further comprises:
determining a composite user profile based on the first weight for the first user profile and the second weight for the second user profile; and
generating the first personalized device session based on the composite user profile.

19. The non-transitory, computer-readable medium of claim 17, further comprising:
determining a ratio of a first amount of time and a second amount of time, wherein the first amount of time corresponds to use of the first user device by the user, and wherein the second amount of time corresponds to use of the first user device by one or more other users; and
determining the first weight based on the ratio.

20. The non-transitory, computer-readable medium of claim 17, further comprising:
determining a first number of successful authentications using the first authentication type;
determining a second number of unsuccessful authentications using the first authentication type;
determining a ratio of the first number of successful authentications to the second number of unsuccessful authentications; and
determining the first weight based on the ratio.

* * * * *